(12) United States Patent
Ramnauth et al.

(10) Patent No.: US 7,096,913 B2
(45) Date of Patent: Aug. 29, 2006

(54) APPARATUS AND METHOD FOR MOVING FRAMEWORKS BETWEEN WORKSTATIONS

(75) Inventors: Vinode Ramnauth, Caledon East (CA); Leon Gimelshtein, Thornhill (CA)

(73) Assignee: Pro-Line Automation Systems, Ltd., Ontario (CA)

( * ) Notice: Subject to any disclaimer, the term of this patent is extended or adjusted under 35 U.S.C. 154(b) by 50 days.

(21) Appl. No.: 10/716,344

(22) Filed: Nov. 18, 2003

(65) Prior Publication Data

US 2004/0099372 A1 May 27, 2004

Related U.S. Application Data

(60) Provisional application No. 60/427,236, filed on Nov. 19, 2002.

(51) Int. Cl.
*B29C 65/02* (2006.01)

(52) U.S. Cl. .................. 156/391; 156/502; 156/580; 156/583.1

(58) Field of Classification Search ............. 156/304.1, 156/304.2, 304.5, 304.6, 497, 502, 503, 580, 156/583.1, 391, 556; 29/559, 33 A, 429, 29/783, 791; 198/345.1, 618
See application file for complete search history.

(56) References Cited

U.S. PATENT DOCUMENTS

| | | | |
|---|---|---|---|
| 4,909,892 A | 3/1990 | Quinn et al. | 156/499 |
| 5,006,198 A * | 4/1991 | Pasquini | 156/559 |
| 5,022,143 A | 6/1991 | Kautt | 29/783 |
| 5,112,210 A * | 5/1992 | Weissfloch | 425/383 |
| 5,125,495 A | 6/1992 | Ganzberger et al. | 198/345.1 |
| 5,370,835 A | 12/1994 | Sturtz | 264/248 |
| 5,448,819 A | 9/1995 | Grassi | 29/558 |
| 5,660,670 A | 8/1997 | Sturtz | 156/304.2 |
| 5,753,065 A | 5/1998 | Buzzelli | 156/304.6 |
| 6,006,408 A | 12/1999 | Roat | 29/33 A |
| 6,086,703 A | 7/2000 | Sturtz | 156/267 |
| 6,099,212 A | 8/2000 | Marocco | 408/3 |
| 6,116,829 A | 9/2000 | Gnann et al. | 409/132 |
| 6,294,044 B1 | 9/2001 | Schwaiger et al. | 156/304.2 |

FOREIGN PATENT DOCUMENTS

| | | | |
|---|---|---|---|
| DE | 4029619 A1 * | 4/1991 | |
| DE | 4218552 A1 * | 12/1993 | |
| DE | 19611467 A1 * | 9/1997 | |
| EP | 320624 A2 * | 6/1989 | |
| EP | 0 443 398 | 2/1991 | |
| EP | 678374 A2 * | 10/1995 | |

* cited by examiner

*Primary Examiner*—Sue A. Purvis
(74) *Attorney, Agent, or Firm*—Gifford, Krass, Groh, Sprinkle, Anderson & Citowski, P.C.

(57) ABSTRACT

An apparatus and a method for moving frameworks such as window frames or sashes from a plastic frame welding machine to a work station for further processing of the frameworks are disclosed. Two tracks are mounted at an elevated position so they extend horizontally from the welding machine to the workstation and an arm assembly is mounted for movement along each track. Preferably each arm assembly has gripping devices arranged one above the other each capable of releasably engaging and gripping one of the frameworks. An actuator is provided to move each arm assembly along its track from a position where the arm assembly can engage the frameworks when they are in the welding machine and then move them to a position where the grippers can grip the frameworks at the workstation.

19 Claims, 13 Drawing Sheets

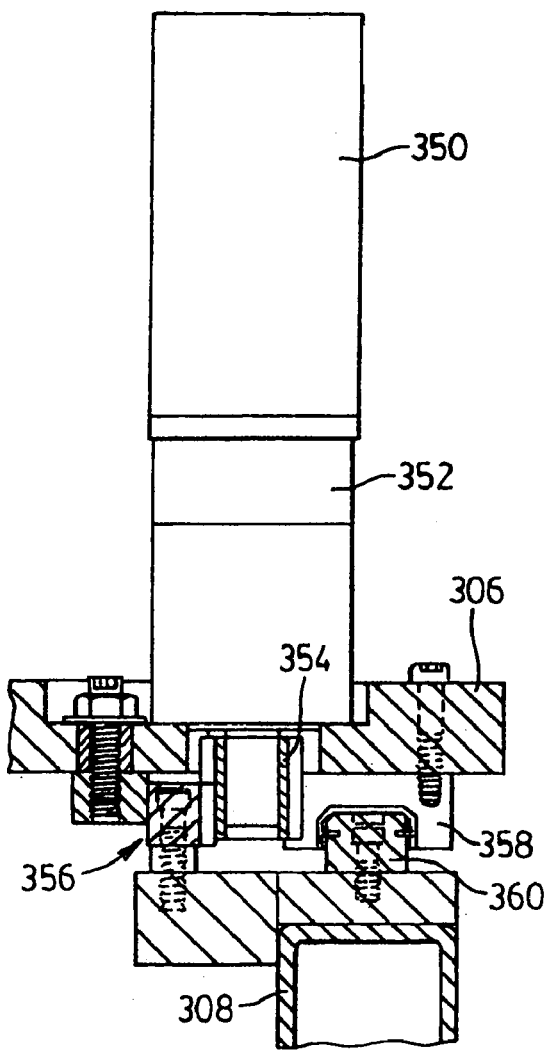
FIG. 12
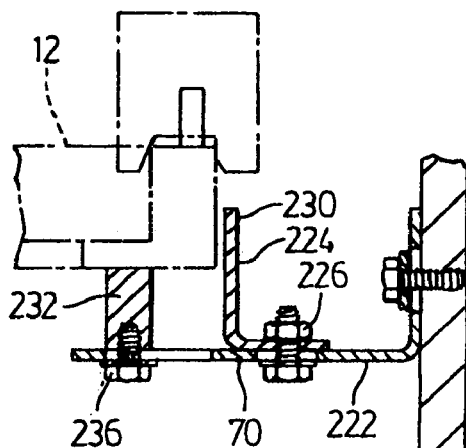
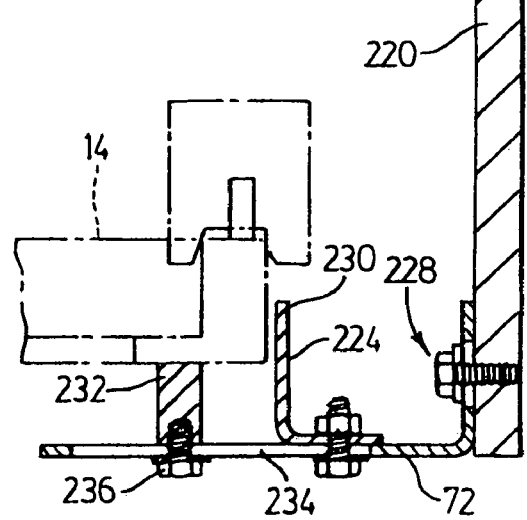
FIG. 13

APPARATUS AND METHOD FOR MOVING FRAMEWORKS BETWEEN WORKSTATIONS

PRIOR APPLICATION

This application claims priority on the basis of and is related to previously filed U.S. Provisional Patent Application No. 60/427,236 filed Nov. 19, 2002.

BACKGROUND OF THE INVENTION

This invention relates to apparatus and methods for moving frameworks, such as window frames or sashes between manufacturing workstations such as between a welding machine and a workstation for "cleaning" of the frameworks.

It is known to provide for the welding of plastic window frames and in particular to provide a horizontal four-head welding machine capable of positioning plastic sections for two or more window frames for simultaneous welding. Subsequent to welding the window frames or sashes, it is typically necessary to clean the corners of the welded frames or sashes of excess material resulting from the welding process. This is commonly achieved with "corner cleaning machines". It is also known to have automated processes and/or equipment which transfer the welded frames to the corner cleaning machine for processing.

Despite the existing capacity of known welding machines to weld two or more window frames or sashes simultaneously, known corner cleaning machines are typically only capable of cleaning one window frame or sash at a time and many known processes and apparatus are typically only capable of transferring one frame at a time to the corner cleaning machine. Accordingly it is a desired objective of the window frame manufacturing industry to be able to quickly and reliably transfer two welded window frames from the welding machine to a corner cleaning machine (or other work station) for carrying out a manufacturing step on the frames and to have the two frames processed or cleaned at substantially the same time. In this way the workstation or workstations downstream from the welding machine can operate at a speed that closely matches that achievable by the welding machine, thus achieving maximum efficiencies and increasing the output of the production line.

U.S. Pat. No. 6,086,703 issued Jul. 11, 2000 to Willi Sturtz Maschinenbau GmbH teaches a method and apparatus for manufacturing two plastic window frames at substantially the same time using a horizontal four-head welding machine. Plastic sections are clamped in the welding machine and are welded so as to create two window frames at the same time, these being arranged one above the other in the welding machine. After at least partial cooling, the welded window frames are released and removed. Support elements, which may be in the form of guide rails or rollers are moved at two opposite sides underneath each of the two window frames, these elements being located adjacent two welding heads. When these two welding heads are moved outwardly to release the frames, the frames rest on the support elements on one side of the machine and on the other side on the two other welding heads which are located on a movable carriage. This carriage is then moved horizontally to cause the frames to be moved at least partially out of the welding machine. The frames are then moved to an intermediate station on two conveyor belts located one above the other. The frames can then be moved to a workstation such as a bead cleaning machine.

Recent U.S. Pat. No. 6,006,408 issued Dec. 28, 1999 to Wegoma, Inc. teaches a widow frame weld seam cleaner having a fixed support head and a movable support head. This machine cleans only one window frame at a time. The window frame is engaged by an inner conveyor belt that moves the frame into and out of a first cleaning position for cleaning and machining the top corners of the window frame, and into and out of a second cleaning position for cleaning and machining the bottom corners. The inner conveyor includes fixed and movable fences, tabletop back fences, and clamps.

It is an object of one aspect of the invention to provide an improved apparatus for moving frameworks, such as window frames or sashes from a welding machine or other work station to another work station for further processing of the frameworks, this apparatus being able to efficiently move more than one framework at one time.

It is a further object of an aspect of this invention to provide an apparatus for moving frameworks from one work station to another work station for further processing, this apparatus being reliable and able to move the frameworks relatively quickly in a manner so they will not be damaged during transport to the next workstation.

It is an additional object of another aspect of the invention to provide an improved method of manufacturing plastic frameworks, such as window frames, using a four-head welding machine wherein two frameworks are welded simultaneously in the welding machine and then they are pulled simultaneously and horizontally to the next workstation for further manufacturing steps.

SUMMARY OF THE INVENTION

According to one aspect of the invention an apparatus for moving welded frameworks each having four corners, such as window frames or sashes, from a welding machine to a workstation for further processing of the frameworks includes a track adapted for mounting at an elevated position so as to extend substantially horizontally from the welding machine to the workstation. There is also an arm assembly mounted for movement along the track and having gripping devices arranged one above the other and below the track during use of the apparatus, each gripping device adapted to releasably engage and grip a respective one of the welded frameworks. The apparatus further includes an actuator arrangement for moving the arm assembly along the track between a first position where the arm assembly can engage the frameworks when they are arranged one above the other in the welding machine and then move the framework to a second position where the gripping devices engage and grip the frameworks at the work station during use of the apparatus.

Preferably the arm assembly includes a lead arm spaced horizontally away from the gripping devices and the apparatus includes a vertical linear actuator for moving the lead arm selectively in a vertical direction whereby, during use of the apparatus, the vertical linear actuator is able to lower the lead arm into openings formed by the frameworks and the actuator arrangement is then able to move the lead arm horizontally to remove the frameworks from the welding machine.

According to another aspect of the invention, an apparatus for moving frameworks, such as window frames or sashes, from a welding machine to a workstation for further processing of the frameworks includes two parallel tracks adapted for mounting in an elevated position so as to extend substantially horizontally from a welding machine to the workstation. There are also two arm assemblies each mounted for movement along a respective one of the tracks and each has two gripping devices arranged one above the other. One gripping device of one arm assembly is paired with and horizontally aligned with a respective one of the gripping devices of the other arm assembly. Each pair of gripping devices is adapted to engage and grip one of the frameworks. There are also two actuator arrangements for moving respectively the arm assemblies along the tracks between a first position where the arm assemblies engage the two frameworks when they are arranged one above the other in the welding machine and then move the two frameworks to a second position where the gripping devices engage and grip the frameworks at the workstation during use of the apparatus.

Preferably this apparatus includes first and second pairs of horizontally extending guide rails adapted to extend from the workstation towards the welding machine with the first pair being located above and spaced apart from the second pair. These guide rails are used to guide and support the frameworks as they are moved to the workstation.

According to a further aspect of the invention, an apparatus for moving frameworks, such as window frames or sashes, from a first workstation to a second workstation for further processing of the frameworks includes a track adapted for mounting so as to extend horizontally from one location adjacent the first workstation to another location adjacent the second workstation. An arm assembly is mounted for movement along this track and is adapted to move first and second separate frameworks simultaneously from the first workstation to the second workstation. First and second pairs of horizontally extending guide rails are also provided and are adapted for mounting so as to extend substantially from the first workstation to the second workstation. The first pair is located above the second pair and the distance between the guide rails of each pair corresponds substantially to an external dimension of each framework. The apparatus also includes a power actuator arrangement for moving the arm assembly along the track as required for the movement of the separate frameworks from the first workstation to the second workstation.

Preferably the arm assembly includes an arm device for engaging and moving the first and second frameworks and a linear actuator for moving the arm device selectively in a vertical direction.

The preferred apparatus and process described herein allows the simultaneous processing of at least two window frames or sashes, thereby increasing the efficiency of the welding machine and a subsequent frame processing machine such as a corner cleaning machine. Also an intervening processing machine can optionally be positioned between the welding machine and the cleaning machine, for additional processing of the frames, if desired.

According to yet another aspect of the invention, a method of manufacturing plastic frameworks, such as window frames or sashes includes mounting plastic sections for making two frameworks at a distance one above the other in double welding heads of a horizontal-four-head welding machine and then clamping the sections in the double welding heads and welding the sections together in the double welding heads to form two welded frameworks. The frameworks are then allowed to at least partially cool so that the plastic sections of each framework are firmly connected together. The welded frameworks are then released from the double welding heads so that they can be moved horizontally therefrom. The welded frameworks are then pulled horizontally from the welding machine along respective first and second pairs of horizontally extending guide rails using an arm arrangement movably mounted on at least one horizontally extending track. The frameworks are pulled to a workstation for further manufacturing steps on the frameworks. The first pair of guide rails is located above the second pair. The further manufacturing steps are then completed on the frameworks.

Preferably the arm arrangement comprises two separate arm assemblies, each of which is movably mounted on its own horizontally extending track.

Further features and advantages of preferred embodiments of the invention will become apparent from the following detailed description, taken in conjunction with the accompany drawings.

BRIEF DESCRIPTION OF THE DRAWINGS

FIG. 12 is an elevational cross sectional view of a portion of the corner cleaning machine, this view being taken along the line XII—XII of FIG. 4;

FIG. 13 is a transverse cross sectional view illustrating the rails that support and guide the frame works, this view being taken along the line XIII—XIII of FIG. 5;

DETAILED DESCRIPTION OF PREFERRED EMBODIMENTS

Figure 1:
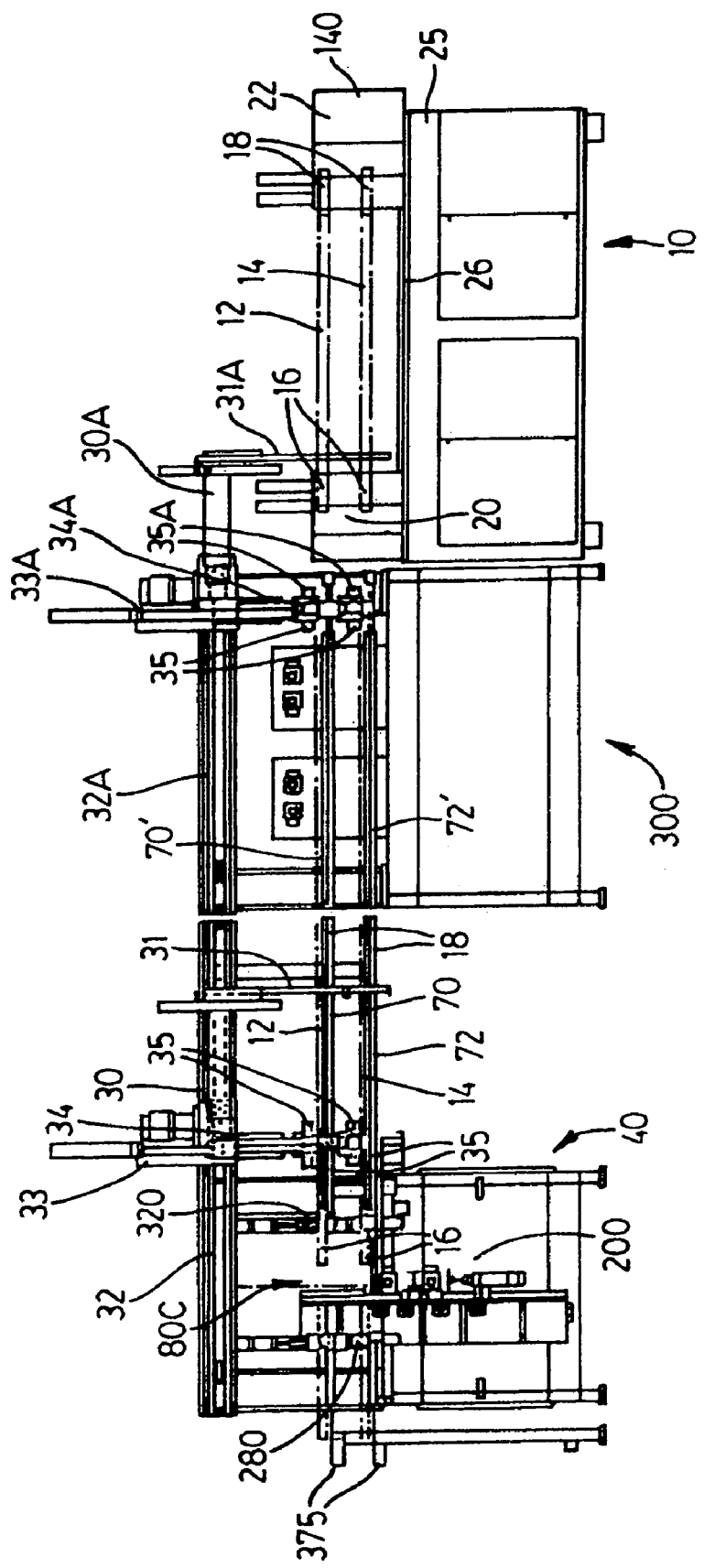
FIG. 1 is a side elevation of an apparatus for manufacturing frame works, such as window frames or sashes, this apparatus including a four-point automatic welder (shown on the right), an intervening processing machine, a corner cleaning machine, and an apparatus for moving the frameworks from the welder to the cleaning machine.
Figure 2:
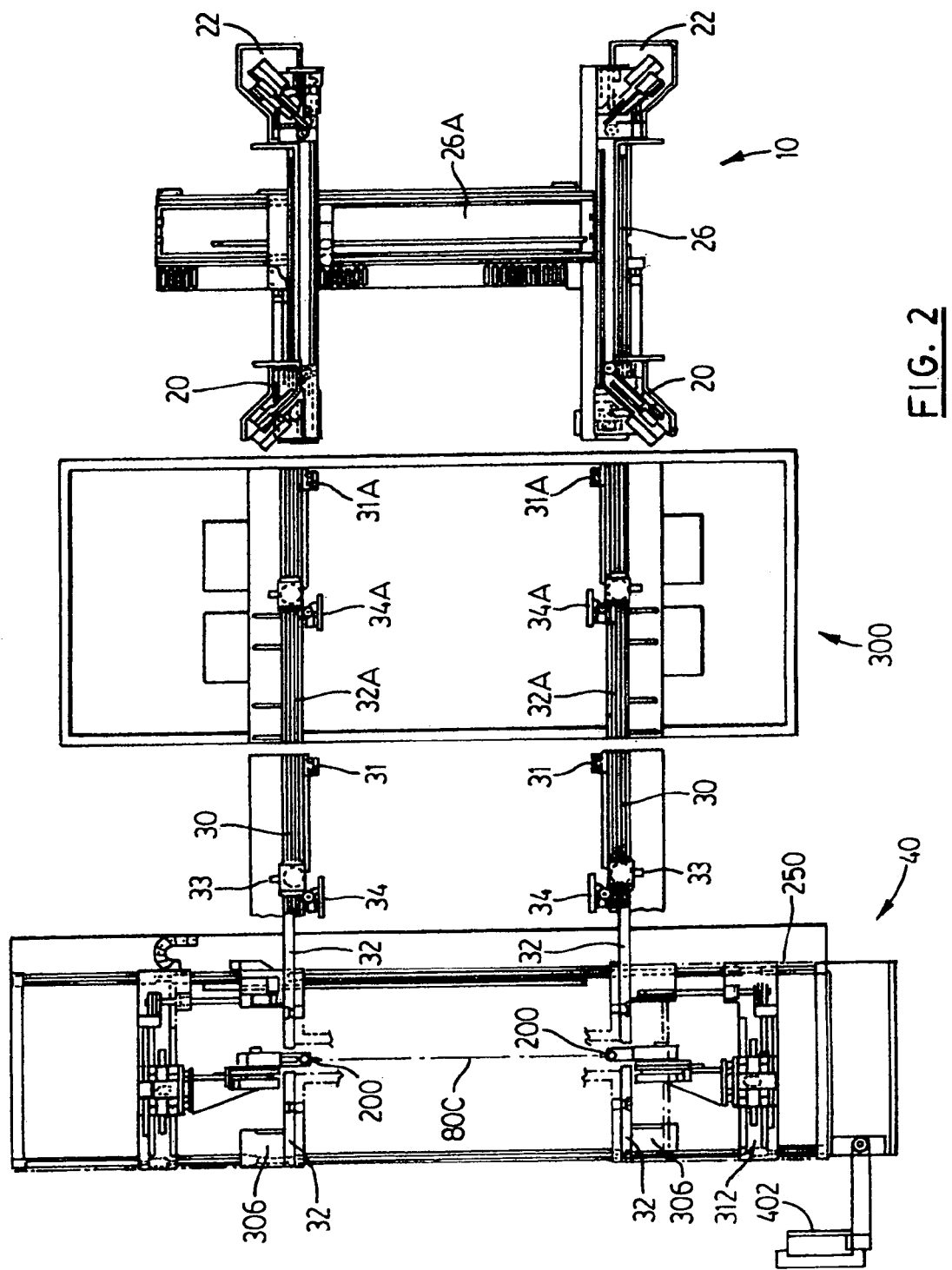
FIG. 2 is a top view of the apparatus of FIG. 1.

Shown on the right side of FIGS. 1 and 2 is a known type of four-point automated welding machine 10 capable of welding the four corners of two window frames or sashes 12 and 14 (described generally herein as frameworks). In the welding machine, the window frames are arranged one above the other as shown and are spaced apart a suitable distance for mounting and welding purposes. It will be understood that each of the frames 12, 14 has four corners with, for example, two left side corners located at the left edge 16 and two right side corners located at the right edge 18. The window frames or frameworks are shown in dotted lines in various positions in the drawings and, in FIG. 1, they are shown in the welding machine. The left side corners are positioned within two left side welding units 20 wherein these corners can be heated and welded together by suitably electrically heated welding plates. Similarly the right side corners 18 are welded in right side welding units 22. It will be appreciated that such four pointed automated welding machines are well known in the plastic frame manufacturing industry and accordingly a detailed description herein is deemed unnecessary. This welding machine will only be described to the extent necessary to understand the operation and use of the present invention.

The distances between the left and right side welding units 20, 22 and between the two welding units on each side are adjustable so as to accommodate window frames of different widths and lengths. In the illustrated welder, the right side welding units are the fixed units while the left side welding units 20 are movable in the horizontal direction along suitable guide rails 26 mounted on the welder frame 25. The guide rails are mounted on a cross mounting rail 26a which allows for the distance between the two corner welders on each of the left and right sides to be adjusted. As will be discussed further below, the welding units, once welding is completed, are able to hold the window frames in a horizontal position where they can be picked up by the robot arm assemblies of an apparatus constructed in accordance with the invention for moving the two frameworks to another work station for further processing of the frameworks. In one embodiment, these arm assemblies are able to transfer the two frameworks simultaneously to a corner cleaning machine to be described.

Figure 11:
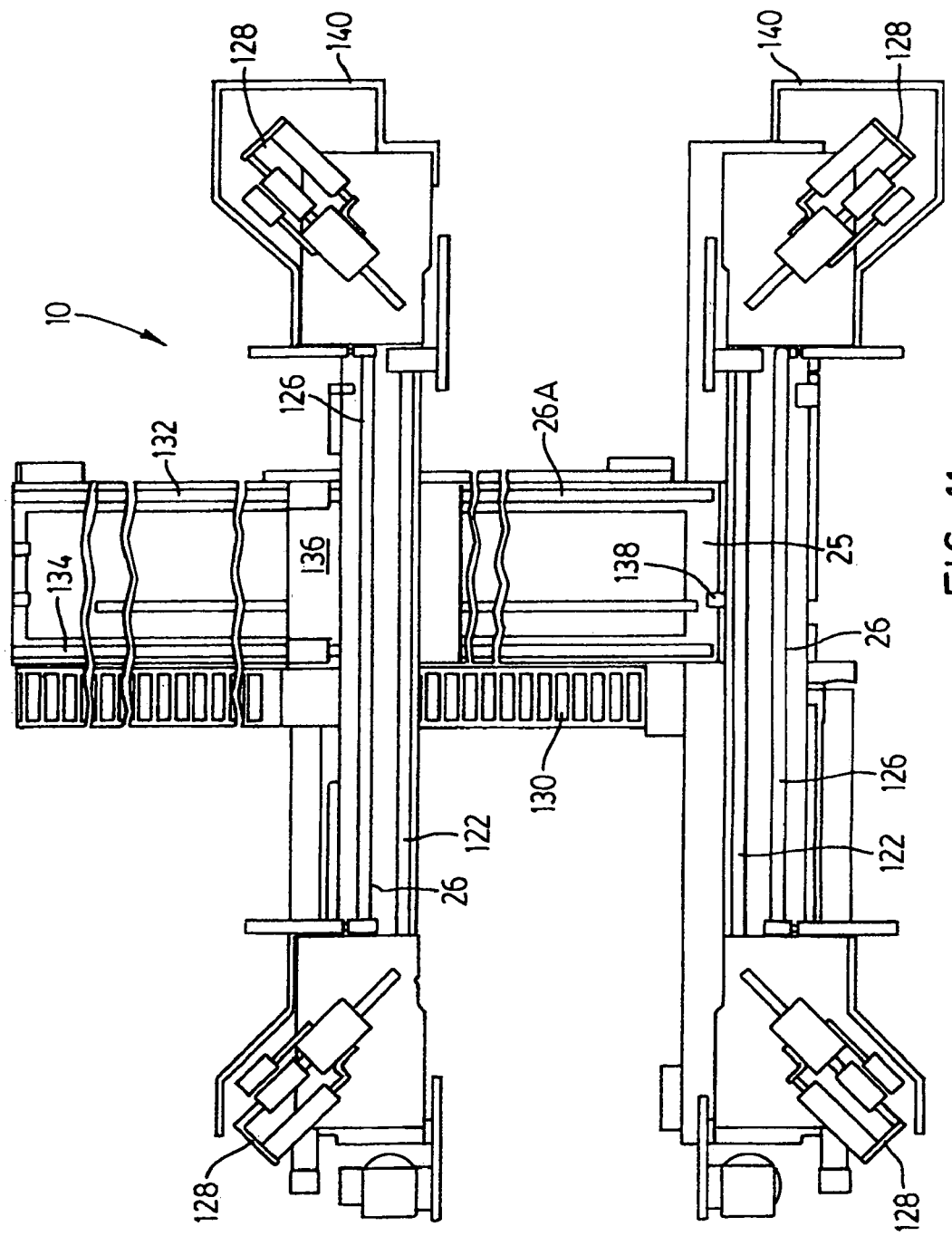
FIG. 11 is a top view of the four-point automatic welder.

Turning to FIG. 11 of the drawings which shows a top view of the preferred welding machine on a larger scale, FIG. 11 illustrates the two rail members 122 and 126 which preferably form each of the aforementioned guide rails 26. At each corner of the machine is a heater plate assembly 128. A cable track 130 is provided for the electrical wiring for the welder. Extending parallel to the cable track are two rail members 132, 134 which constitute the aforementioned cross mounting rail 26a. These rails are mounted on the welder frame 25. Mounted on these two rail members is a bridge 136 which movably supports the two welding units that are mounted thereon. A stop 138 is provided to limit the movement of the bridge 136 and the frame supporting the rail members 122, 126. Each welding head can be enclosed by panel members 140 that extend around the exterior of the welding head.

Turning now to the apparatus of the invention for moving the window frames, located adjacent to the welding machine 10 is a robot arm assembly indicated generally at 30. In the preferred, complete apparatus for transferring two frameworks from the welding machine, there are two of these robot arm assemblies which are spaced apart on either side of the apparatus, each being mounted on an overhead beam or track 32. Preferably this track 32 is supported on the corner cleaning machine by support posts. The preferred arm assembly on each side of the apparatus includes a lead arm 31 and a gripping assembly arm 34, these being shown on a larger scale and in more detail in FIG. 6.T*he* lead arm 31 and the gripping assembly arm 34 are connected together as one arm assembly or unit. Each gripping assembly arm has two grippers or gripping devices 35 arranged one above the other and below their respective track 32. These gripping devices are positioned at the lower end of their respective arm 34 and are connected to selectively clamp the window frames. In other words, the gripping devices are shaped and designed to grip the two welded frameworks 12, 14 and releasably clamp them in place in a desired position for processing either by the corner cleaner as will be described below or by a different form of workstation capable of carrying out additional manufacturing steps after the welding operation. It will be understood that the preferred grippers 35 each have two recesses which allow for gripping of the framework from either the left or the right side. Each of the lead arms and gripping assembly arms are movable vertically to allow the gripping assembly arm 34 and the lead arm 31 to pass over the frameworks 12, 14 during processing as will be discussed below.

The lead arm 31 is spaced horizontally away from the gripping devices 35 and the gripping assembly arm 34. The lead arm extends vertically and optionally can have two spaced apart fingers 150, 152 mounted on a bottom end-section as shown. Alternatively instead of these fingers there can be an elongate, plastic cylinder member extending along the lower section of the lead arm frame 154, this plastic cylinder helping to protect the frameworks when they are engaged and pulled by the lead arm. The top end of the lead arm frame 154 is held by screw 156 that extends through support bracket 158. The lead arm 31 can be moved upwardly or downwardly by means of two separate pneumatic linear actuators 160 and 164 arranged one on top of the other. The two linear actuators 160, 164 act as piggy-backed actuators each having their own stroke length. Which actuator is used depends on the vertical distance the lead arm 31 is to be moved. Thus, this arrangement permits the lead arm to be moved different distances as may be required. Note also that the strokes of the two actuators can be combined to obtain the maximum vertical stroke. The actuator rods are connected together at their outer ends with the actuator rod of the actuator 160 able to move upwardly from the position shown in FIG. 6 and the actuator rod of the actuator 164 able to move downwardly from its cylinder. Extending along the front side of the actuator 160 is a support member 162 which slidably supports the lead arm for vertical movement and is connected to horizontal arm section 166. Extending upwardly from the support bracket 158 is the linear actuator 164 which is mounted on the bracket. The arm section 166 is positioned adjacent the inside wall of the track. The left end of the arm section 166 is attached by screws 168 to an arm connector 169. A horizontal support plate 170' is connected by two screws 172' to the top edge of the connector 169 and mounted on top of this plate is an electric motor 174'. This motor has a downwardly extending output shaft that drives the spur gear 176 outlined in dashed lines in FIG. 6. The motor 174' and gear 176 are part of an actuator arrangement for moving the arm assembly along the track 32 from a first position where the arm assembly can engage the frameworks 12, 14 arranged one above the other in the welding machine to a second position where the gripping devices 35 engage and grip the frameworks at a work station, for example the cleaning machine. It will be understood that the track 32 is adapted for mounting at an elevated position (as shown) so as to extend substantially horizontally from the welding machine 10, to another work station such as a welded frame cleaning machine. The preferred track comprises a rigid steel tube which can have a substantially rectangular transverse cross section. Extending along the top of this track is an elongate rack 180 having numerous teeth extending along its length. The gear 176 operably engages the toothed rack 180. The rotation of the gear 176 by the drive motor 174' will cause the complete arm assembly to move horizontally along the track 32.

A system is also provided for moving each assembly arm 34 upwardly or downwardly as required for the manufacturing process. Extending upwardly from the connector 169 is a support post or column 33. A small horizontal support plate 182 is attached by screws to the top of this column and mounted on top of the support plate 182 is a pneumatic cylinder 184 which is part of a pneumatic linear actuator. Extending downwardly through a hole in the plate 182 is an actuator rod 186 which can be moved upwardly or downwardly in the cylinder 184 by pressurized air. Connected to the bottom end of this rod and movable thereby is the gripping assembly arm 34. Mounted on this downwardly extending arm are two linear actuators 190 having actuator rods 188. These rods extend from the actuator cylinders and bottoms of these cylinders are mounted on a support plate 192 having two holes 194 through which extend the actuator rods. The bottom end of the rod 186 is connected at 195 to the gripper arm 34. Both of the grippers 35 are raised or lower simultaneously by the actuator rod 186.

Figure 6:
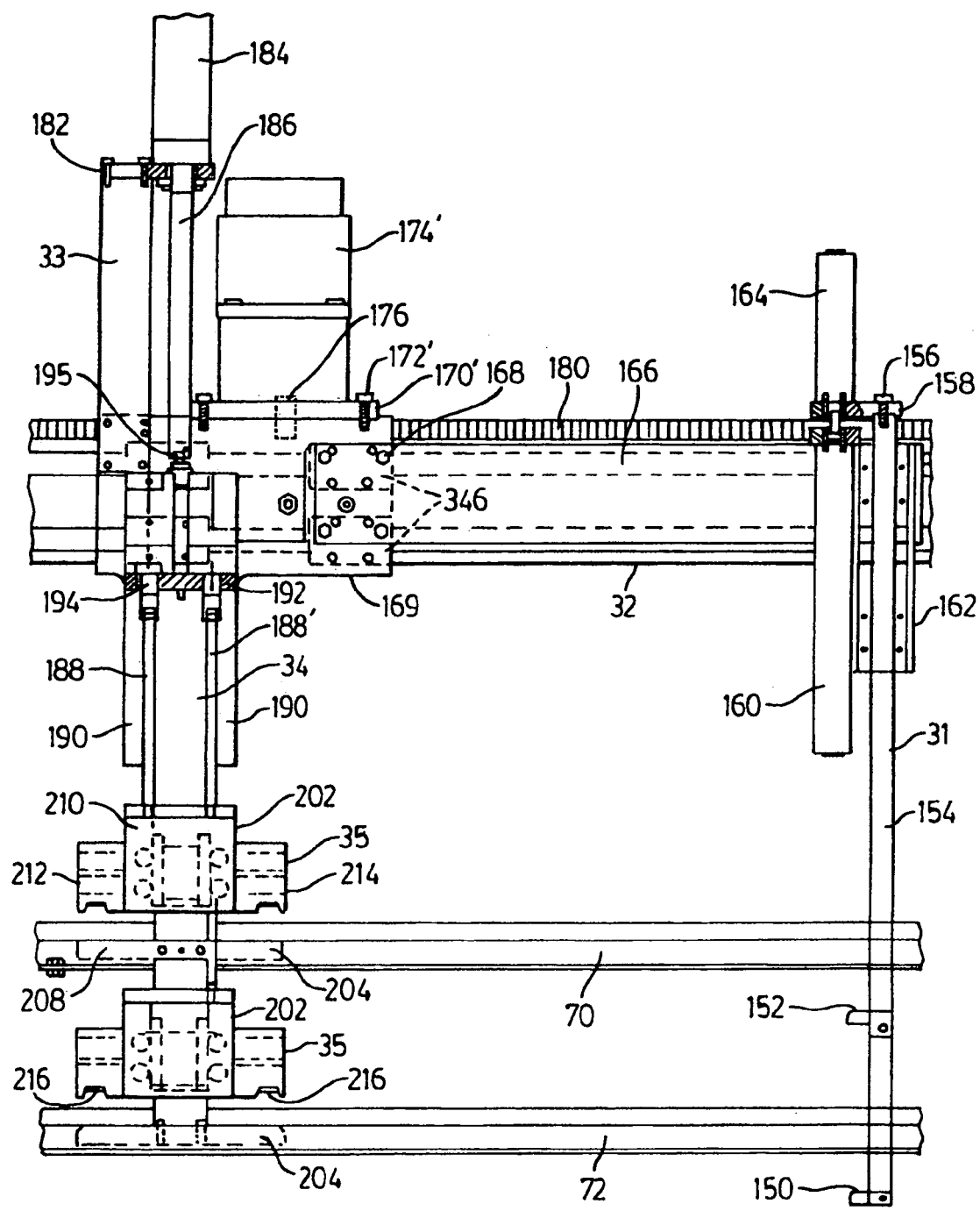
FIG. 6 is a detail side elevation of one of the arm assemblies of the apparatus of the invention for moving frameworks.
Figure 7:
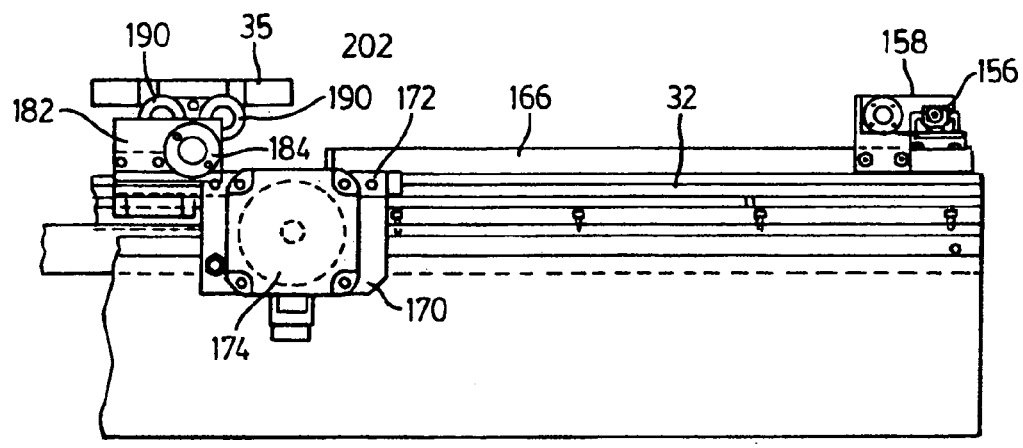
FIG. 7 is a detail top view of the arm assembly of FIG. 6.

Turning now to the construction of the preferred grippers 35, it will be seen from FIG. 6 that each gripper includes an upper gripper assembly 202 and a horizontal gripper plate 204 spaced below the upper gripper assembly. The upper plate 204 is attached by screws to the arm 34 while the lower gripper plate 204 is attached by screws to the bottom end of the arm 34. Each of these plates is provided with an upwardly extending edge flange 208 to help ensure proper horizontal alignment of the window frame. The upper gripper assembly 202 includes a central support member 210 and two side extensions 212, 214 which are attached by screws to the central support member. A recess 216 is formed in the bottom of each side extension and is sized to receive an upper edge of the framework. It will be appreciated that each upper gripper assembly 202 can be moved upwardly or downwardly relative to its gripper plate 204 for the purpose of gripping a side section of the framework. The uppermost gripper assembly 202 is moved upwardly or downwardly by means of the left actuating rod 188 (as seen in FIG. 6) while the lowermost gripper assembly 202 is moved upwardly or downwardly by means of the right actuating rod 188' and it will be understood that these actuating rods are moved by pressurized air in the pneumatic cylinders of the actuators 190. Each of the upper gripper assemblies 202 is slidably mounted on its respective arm 34 which extends downwardly to the bottom gripper plate 204. The arm 34 and the plate 192 are movably vertically by means of the aforementioned linear actuator rod 186 and thus in this way they and the grippers 35 mounted thereon can be moved upwardly above the frameworks so that they can be moved past the frameworks as and when required, for example to move from the left side of the frameworks to the right side.

A significant feature of the apparatus for moving the frame works 16 and 18 from the welding machine to a work station such as the corner cleaning machine is the use of first and second pairs of horizontally extending guide rails 70,72 that are adapted for mounting so as to extend substantially from the welding machine, for example, to the corner cleaning machine, for example. The first pair of guide rail 70 is located above the second pair 72 and the distance between the guide rails of each pair is adjustable so that it corresponds substantially to an external horizontal dimension of each framework 12, 14 arranged horizontally. One preferred construction of these guide rails can be seen from FIG. 13. The upper and lower guide rails can be mounted on vertical extending support plates 220. The plates 220 are movably mounted on and supported by respective mounting platforms 306 (See FIG. 8) of the corner cleaning machine 40. Thus, the rails can be moved inwardly or outwardly as required to accommodate different sizes of windows frames or sashes. Each rail includes two elongate angle members 222 and 224 that are connected together along their length by nut and bolt combinations 226. Each angle member 222 is connected by screws 228 and suitable washers to its respective support plate 220. The angle member 224 has an upwardly extending leg 230 which forms an adjustable guide wall for the frame work 12 or 14 moving therealong. This guide wall's position relative to the plate 220 can be moved inwardly or outwardly a short distance, if required. Mounted on the horizontal leg of the angle member 222 is an elongate support bar 232 the position of which relative to the plate 220 can be adjusted inwardly or outwardly a short distance in order to provide proper sliding support for the framework being made. To provide this adjustment capability, the horizontal leg of the angle member is provided with slots 234 through which extend screws 236 used to attach the bar 232.

FIGS. 1 and 2 illustrate the use of an optional intervening processing machine 300. Although this machine 300 does not per se form part of the present invention, it has been illustrated to show the possibility of the processing machine being inserted between the welding machine 10 and the corner cleaning machine 40. If such a machine is used, it can also be provided with first and second pairs of horizontally extending guide rails 70' 72'. These guide rails effectively extend the length of the guide rails 70, 72 which are mounted on and supported by the cleaning machine 40. Also the intervening processing machine can be provided with an elevated track section 32A which can be mounted at the same height as the track 32 as shown in FIG. 1 and can also be aligned horizontally with the track 32. The track 32A can be constructed in the same manner as the track 32 described above and can be connected to the track 32 in one preferred embodiment. The intervening processing machine can be provided with its own two robot arm assemblies 30A each having a lead arm 31A and a gripping arm 34A. The two lead arms 31A can then be used to pull the frameworks from the welding machine onto the rails of the processing machine 300 and then the upper and lower grippers of the two gripping arms 34a can be used and maneuvered to position the frameworks as required in the intervening machine 300 in a manner similar to that described below in connection with the corner cleaning machine.

Alternatively it is possible to use the same robot arm assemblies 30 on both the intervening machine 30 and the corner cleaning machine 40 assuming that the two tracks 32A are connected to the ends of and are aligned with the two tracks 32 mounted on the cleaning machine. However it will be appreciated that if the same robot arm assemblies are used for both the machine 300 and the corner cleaning machine 40 this can result in slower overall manufacturing times for the window frames or sashes. In other words if only two robot arm assemblies are used in the window frame assembly line, then the intervening processing machine can generally not operate or be used at the same time as the corner cleaning machine whereas if two pairs of robot arm assemblies are used, then it is possible to process a pair of frameworks 12, 14 in the machine 300 at the same time cleaning the corners of another pair of frameworks 12, 14 in the machine 40. Examples of operations that can be carried out in the intervening machine 300 include the drilling of holes or slots for hardware to be fitted on the frames.

The two point corner cleaning machine 40 will now be described in a general way for purposes of understanding the present invention. However it will be understood that two point corner cleaning machines per se are known in the window frame and sash making industry and many of the components of the corner cleaning machine used in combination with the present invention are therefore well known and will not be described herein in detail. A primary new feature of the corner cleaning machine 40 is its capability of cleaning two window frames or sashes at substantially the same time, that is while the two frames are clamped at the same time, one above the other, in the machine 40. It is known to equip such corner cleaning machines with cutting and finishing tools and these tools are indicated generally at 200 in FIG. 1. These tools are applied to the four corners of the window frame or sash for cleaning of debris remaining from the welding process in a known manner and they can also be used to form holes, etc. for window hardware and other purposes.

As can be seen from FIG. 2, the left hand side 250 of the corner cleaner 40 is constructed in substantially the same manner as the right hand side 252. Accordingly it is sufficient for present purposes to describe one side of this machine. With initial reference to FIGS. 3 and 5 a cutting tool 252 in the form of a circular blade is shown, this tool being mounted on the shaft of an electric motor 254. The motor is supported by a mounting plate 256 which in turn is mounted on a tools mounting plate 258. The plate 258 is rigidly connected to a vertically extending mounting plate 260 by means of gussets 261, 262, etc. Attached to the outer side of the plate 260 are two vertically extending rails 264, only one of which is shown. The aforementioned mounting plates and the tools mounted thereon can be moved upwardly or downwardly by means of vertical screw drive assembly 266. The screw drive assembly includes a drive screw 268 that extends vertically and mounted on this screw (and shown in its lowermost position) is a ball nut housing 270 containing a ball nut and this housing is mounted to the bottom end of the mounting plate 260. It will thus be appreciated that rotation of the screw 268 by the electrical motor of the screw drive assembly 266 will cause the tools 200 to be either raised or lowered as required for the cleaning and machining operations. Additional tools shown in FIG. 1 include a drilling unit assembly 272 and above this assembly is shown a knife mounting plate 274. Each of these tools is mounted on the mounting plate 258 so that they can be moved horizontally as well as vertically.

Figure 10:
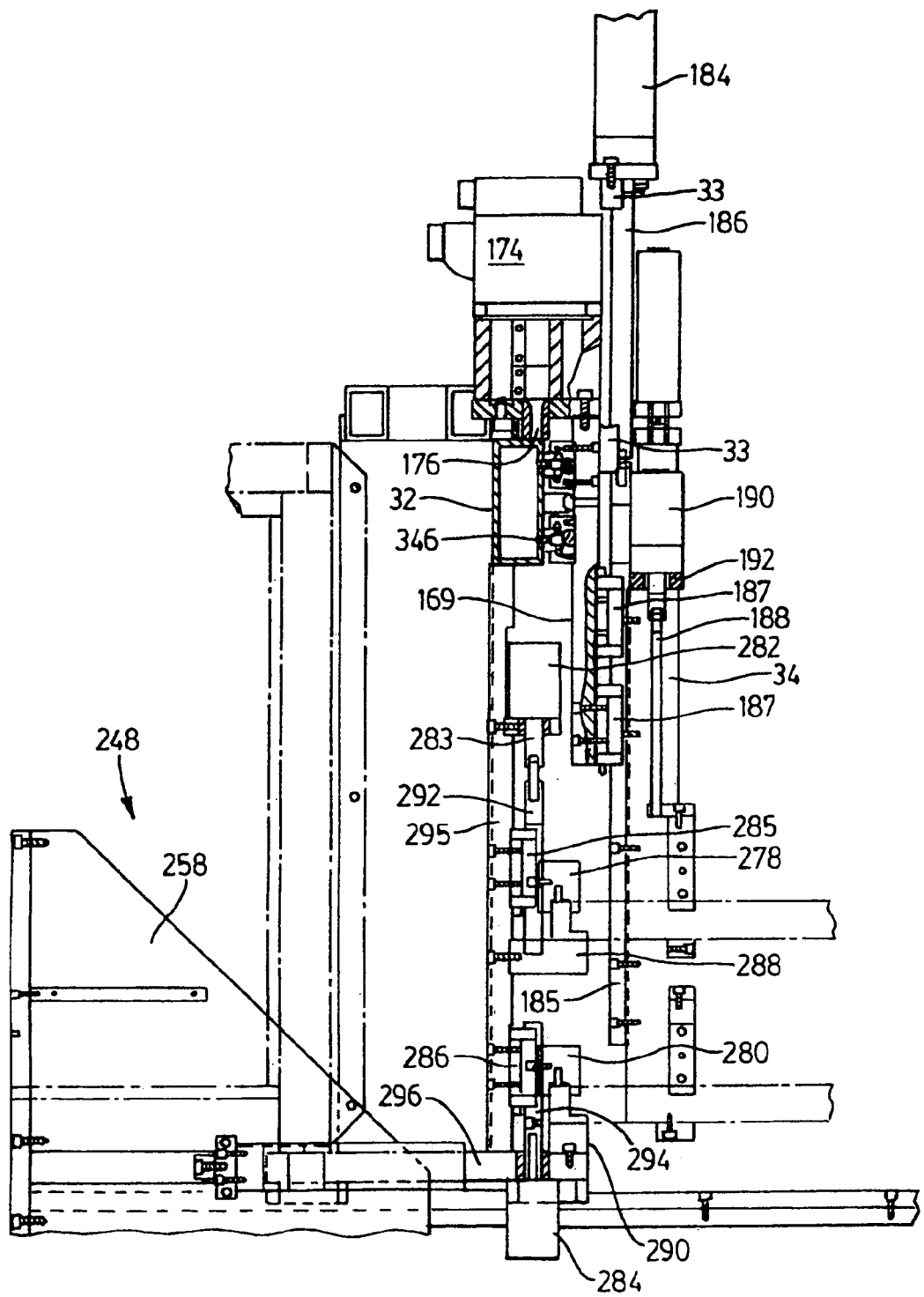
FIG. 10 is a partial end view of the corner cleaning machine, this view showing upper and lower clamping mechanisms for the frameworks and having certain features shown in cross-section.

With reference now to FIG. 10 which shows an upper section of the right side of the corner cleaning machine 40, this view illustrates clearly an upper clamping mechanism 278 and a lower clamping mechanism 280 that are provided in the machine 40 itself for holding the window frames or sashes which are shown in chain-dash lines. The upper clamping mechanism is operated by an upper air cylinder 282 having an actuator rod 283 extending downwardly and connected to the clamp. There is also a lower air cylinder at 284 for operating the lower clamp. The upper clamp is movably mounted by means of an upper ball slide 285 while the lower clamp is movably mounted by a lower ball slide 286. Rigidly mounted below the upper clamp is a rear top support member 288 and rigidly mounted below the lower clamp is a rear lower support member 290. Each of the upper and lower clamping members 278, 280 are rigidly mounted on respective rails 292 and 294 and it is these rails that are connected to one section of the ball slides 285, 286. Both the outer sections of the ball slides and the support member 288 are mounted on a vertically extending support plate 295 which extends between a main mounting plate 296 and the tubular track 32 and is connected thereto. FIG. 10 also illustrates a vertical guideway 185 attached by screws to the outer surface of the arm 34. This guideway is mounted for sliding movement on the vertical support plate 169 by means of two sliders 187. In this way, the arm 34 is properly supported for vertical movement relative to the plate 169.

Figure 8:
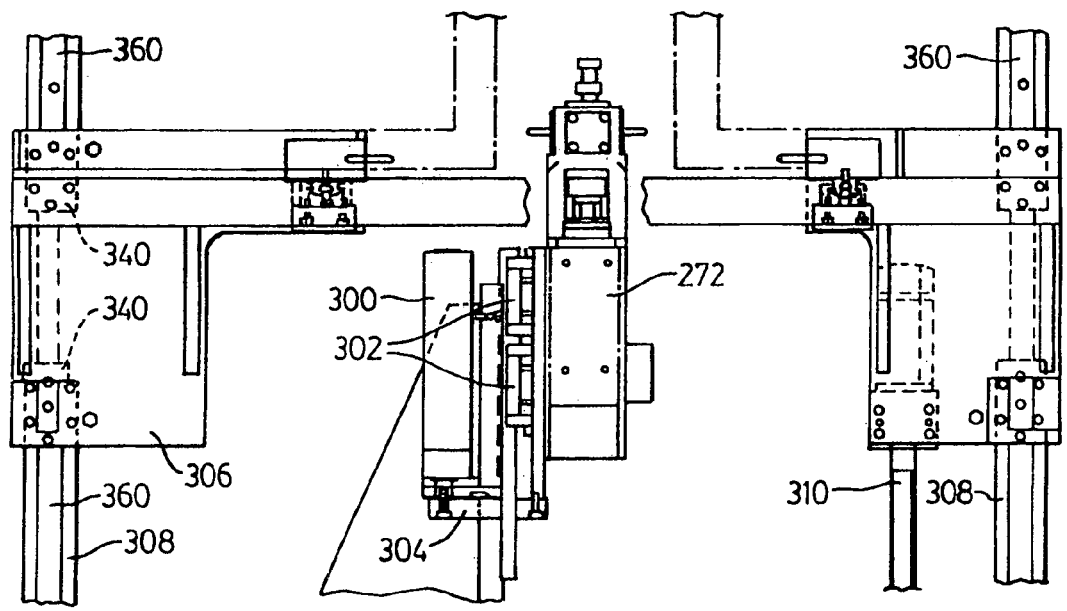
FIG. 8 is a detail top view showing one side of a corner cleaning machine with a portion broken away for sake of illustration.

Turning now to the detailed view of FIG. 8, the drilling unit assembly 272 can be seen from above as well as air cylinder 300 capable of moving the drill unit horizontally. The drilling unit is mounted on ball slide 302 and the actuating rod of the air cylinder is connected to the mounting plate for the drill unit by means of push-pull bracket 304. Also visible in FIG. 8 is the main mounting platform 306 which extends between and over two rails 308 of the corner cleaning machine 40. Also shown is a portion of the horizontal screw drive assembly 310. It will be understood that the main mounting platform can be moved inwardly or outwardly by means of the screw drive assembly 310 which is connected by means of a ball nut housing (not shown in FIG. 8) to the main mounting plate 312 which also extends between and over the rails 308, this main mounting plate being indicated in FIG. 2. It will thus be seen that the distance between the main mounting platforms 306 can be changed as required to accommodate different sizes of window frames or sashes.

Figure 5:
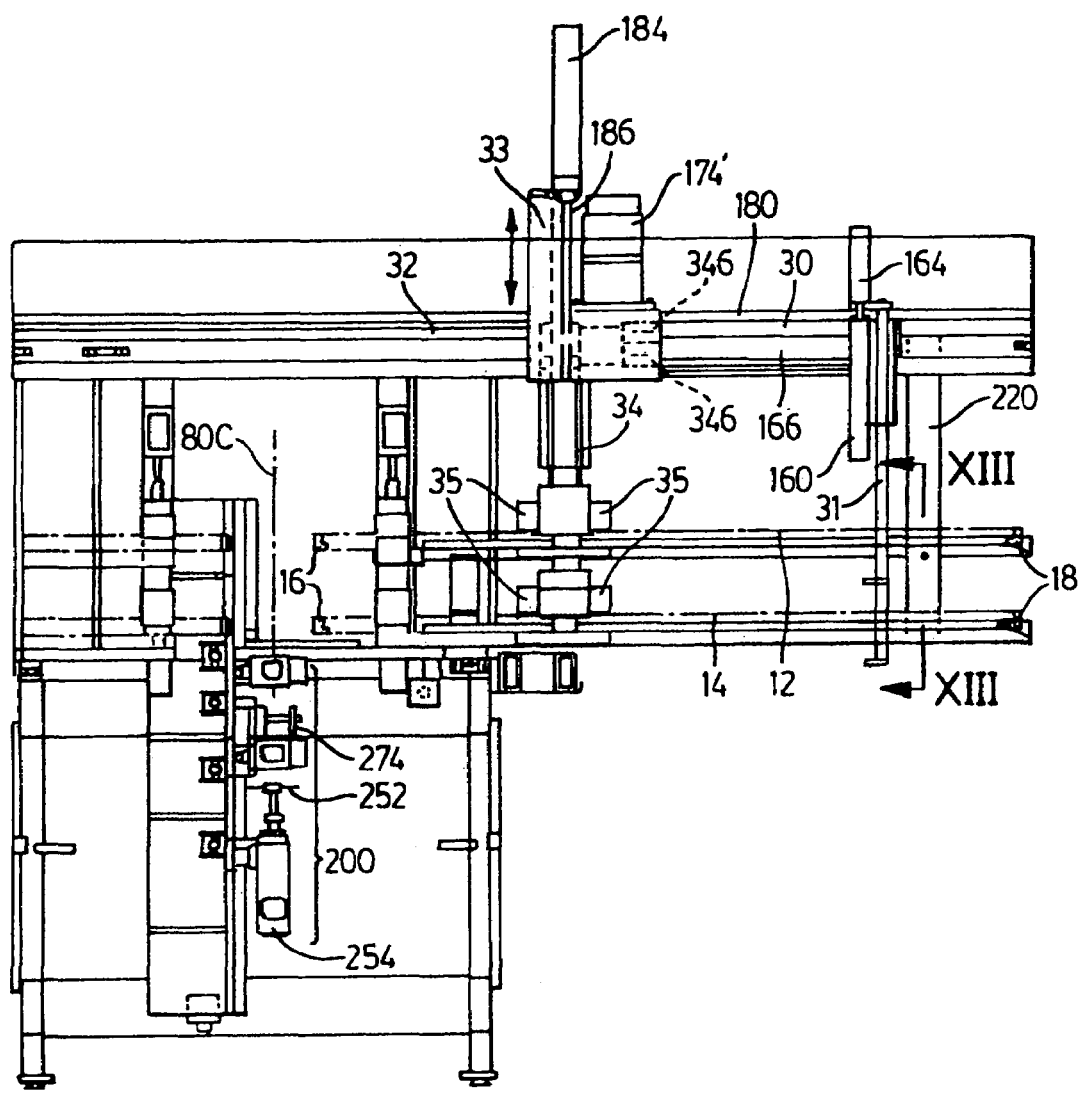
FIG. 5 is a vertical sectional view of a corner cleaning apparatus taken along the line V—V of FIG. 3.
Figure 9:
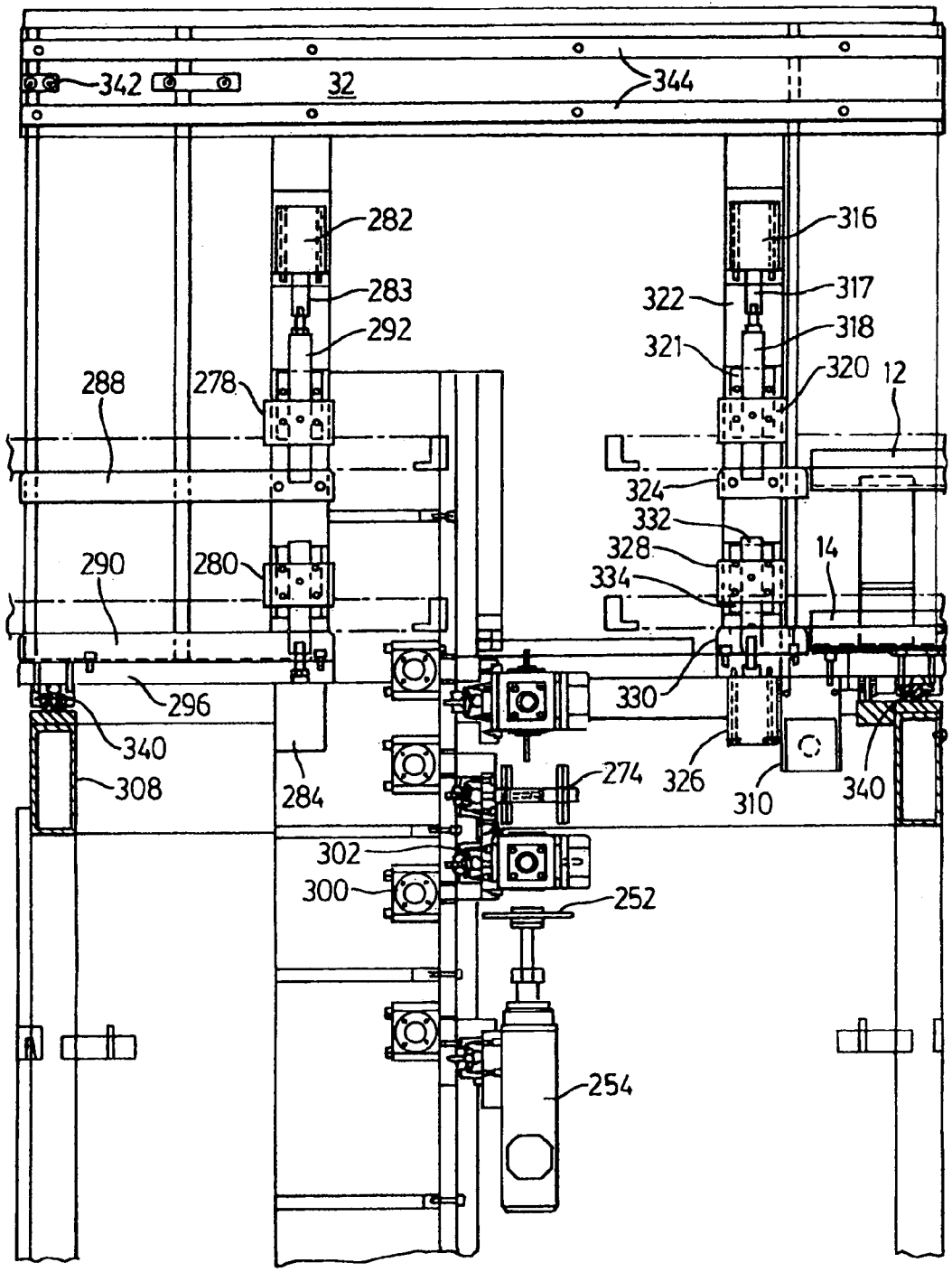
FIG. 9 is a detail side elevation showing a portion of the corner cleaning machine and the clamps to hold the frameworks in position as they are being cleaned.

Turning now to FIG. 9 which is a detailed view of the upper left portion of FIG. 5, there can be seen a further upper air cylinder 316 having a downwardly extending actuator rod 317 that is connected to a movable, vertical rail 318. Mounted on this rail is another upper clamp 320 which can be moved up and down by the air cylinder 316. A ball slide 321 is provided to movably mount the rail 318 to a vertically extending support plate 322. Rigidly mounted below the clamp is a front, top support member 324 and thus the framework can be clamped between the clamp 320 and the support member 324 as and when required. There is additional air cylinder 326 which is mounted below a horizontal support plate and an additional lower clamp 328 which is operated by this air cylinder. Rigidly mounted to the top of the support plate is a front bottom support member 330. The clamp 328 is mounted on movable rail 332 which is mounted by means of ball slide 334 on the support plate 322. Also visible in FIG. 9 is an end of the horizontal screw drive assembly 310. Ball slides 340 are used to slidably mount the main platform 306 to the two parallel rails 308. A stop 342 is provided at the end of the track 32 to prevent movement of the robot arm assembly past this point on the track. Two rail members 344 are mounted by screws on the inside surface of the track and these are used to mount the robot arm assembly for movement along the track. Ball slides 346 mounted on the outside surface of the robot arm assembly (see FIGS. 5 and 6) move along these two rails 344 and support the robot arm assembly.

Figure 4:
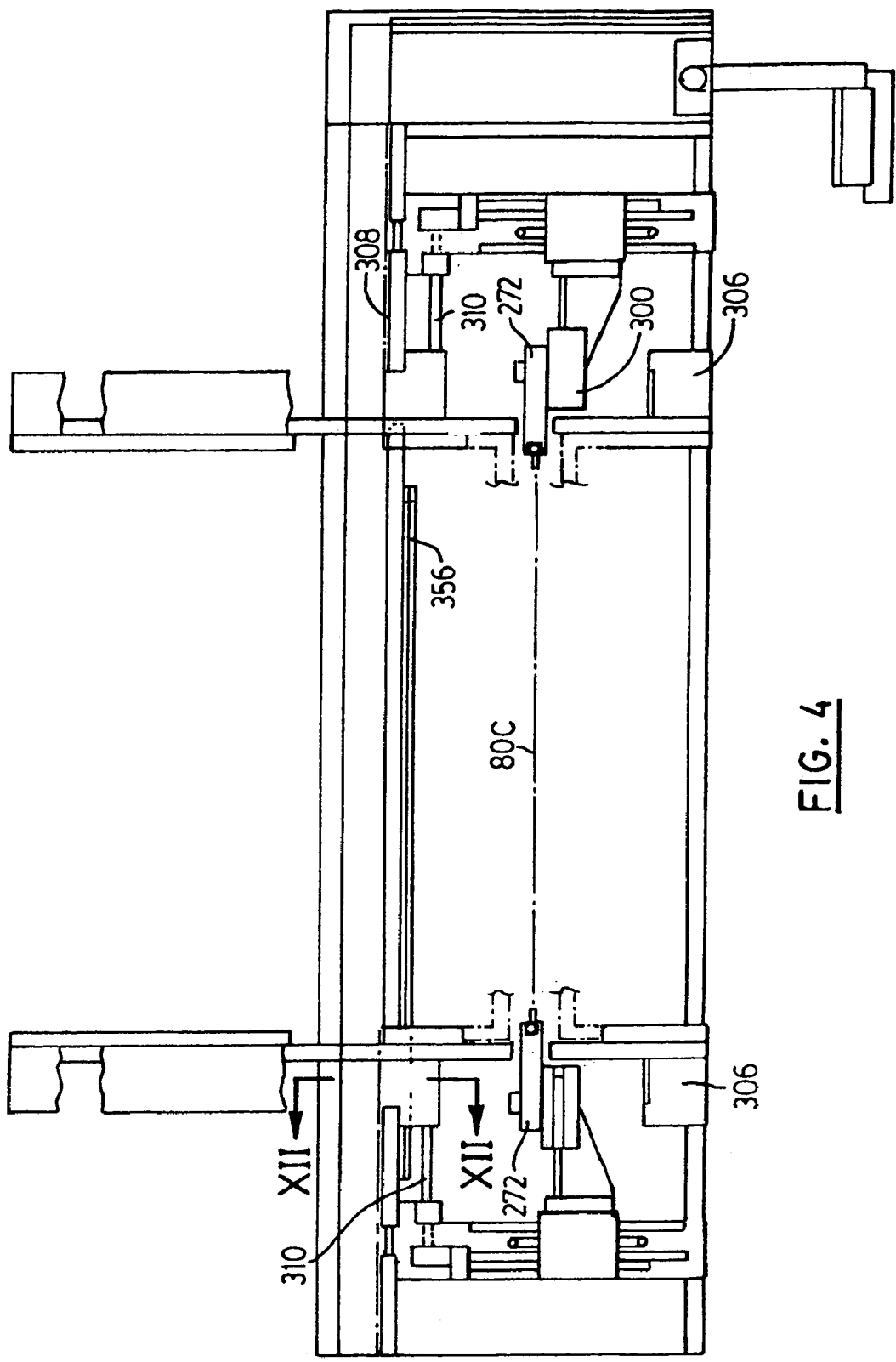
FIG. 4 is a partially cut away top view of the corner cleaning apparatus.

Turning now to the detail view of FIG. 12, there is shown an end portion of horizontal main mounting plate 312. Mounted on top of this plate in a recess formed therein is servo motor 350 which is mounted on top of a planetary gear head 352, which in a preferred embodiment has a gear ratio of 10:1. The output shaft at the bottom of the gear head rotates a spur gear 354 which engages a rack 356. This rack extends along the inner surface of the aforementioned rail 308. The extent of this rack 356 can be seen in FIG. 4. Thus the motor 350 provides a power drive for moving the mounting platform 306 and the equipment mounted thereon along the rails 308. Mounted on the bottom surface of the mounting platform 306 are two spaced-apart and aligned ball slides 358 which permit easy movement along rail 360 which is attached to the top of the larger, tubular rail 308.

Figure 14:
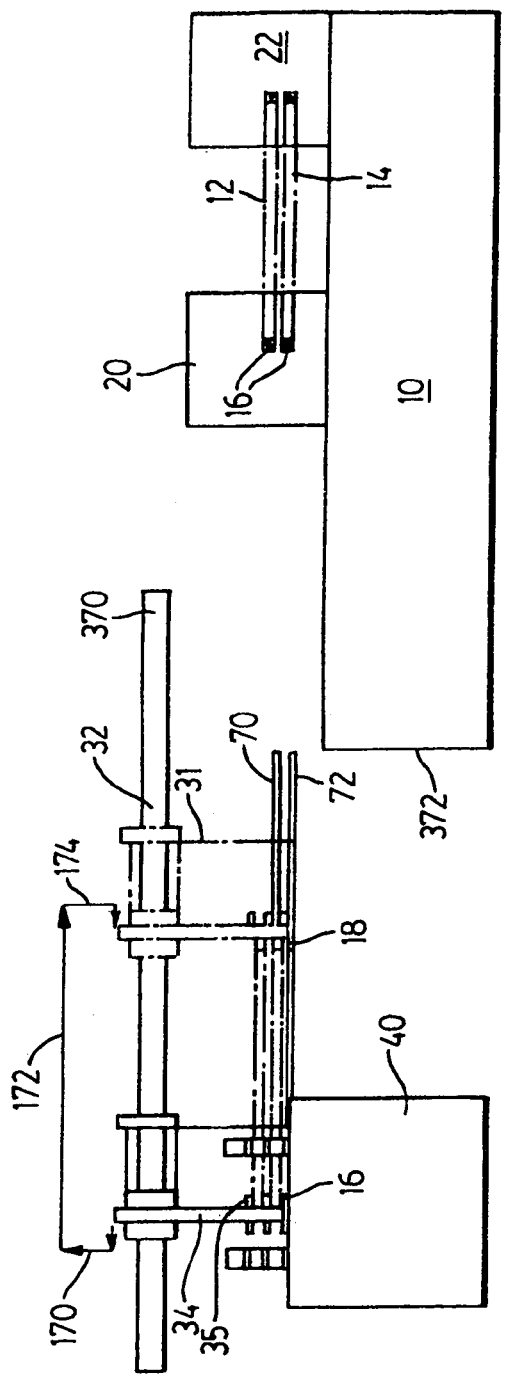
FIG. 14 is schematic side elevation illustrating an apparatus for transferring two window frames or sashes from a four-pointed automated welder (on the right) to a corner cleaner, this view showing a robot-like arm assembly for manipulating the two frameworks and showing two window frames in position for the cleaning of the left side corners of both frames.
Figure 15:
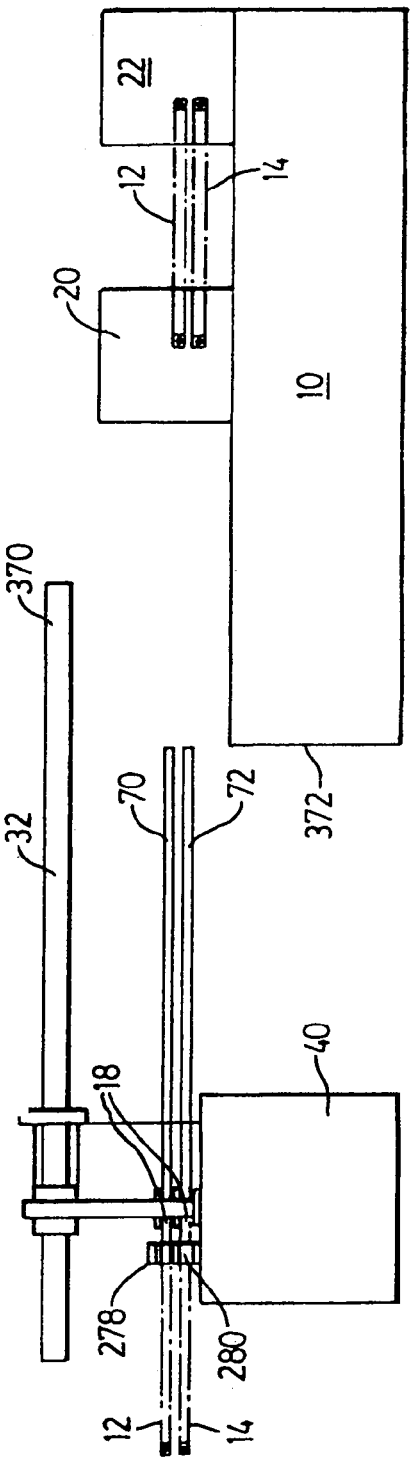
FIG. 15 is a schematic side elevation similar to FIG. 14 but showing a different position of the arm assembly, this position being used for cleaning the two right side corners of the window frames.
Figure 16:
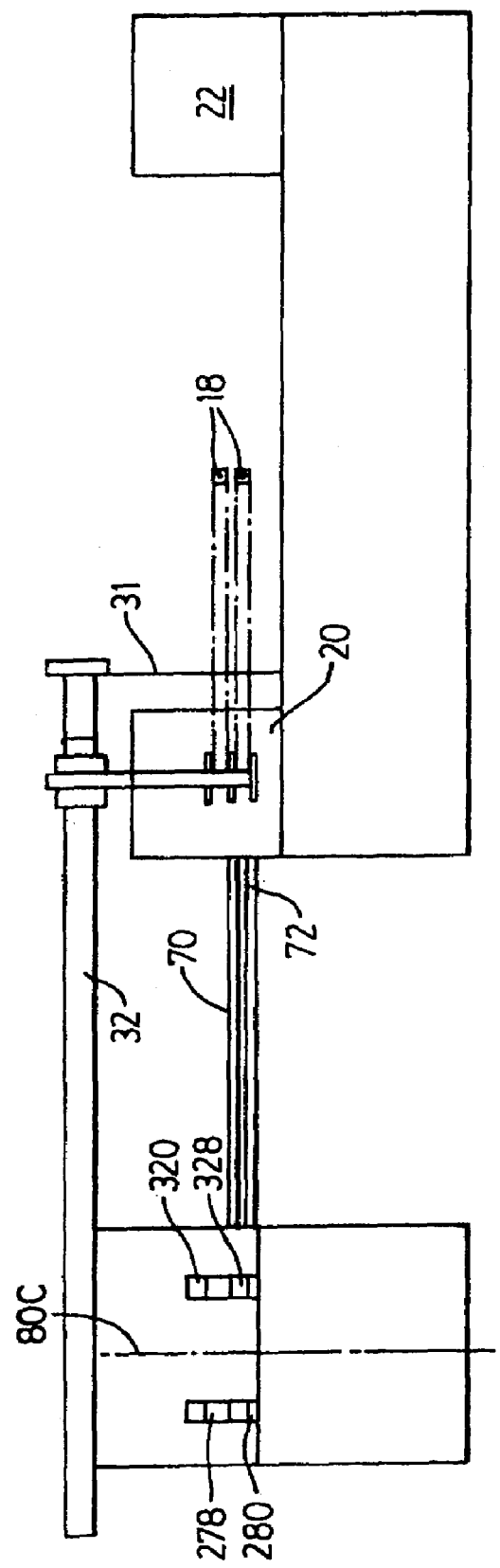
FIG. 16 is another schematic side elevation similar to FIG. 14 but showing two window frames at a pick-up position at the left side of the welder.

Turning now to FIGS. 14 to 16 which illustrate schematically one method of transferring frameworks such as window frames from a four point automated welding machine 10 to a two point corner cleaner constructed in the manner described above. Once the welding of the two frames is completed, the welding machine right side units 22 release the frameworks which are arranged one above the other while the welding machine left side units 20 move them to the left end of the welding machine (this position of the welding unit being shown in FIG. 16). It should be noted that when the left side units release the frameworks, they are still supported in their elevated, space-apart positions by movable pins operated by supporting cylinders, the use and construction of which in a welding machine is known per se. The two robot arm assemblies are then moved to a position at the right end 370 of the tracks. While being moved to the right, the lead arms at least are raised to an elevated position so that the bottom ends of these arms are above the framework 12. These two lead arms are moved to the right of the left frame sections at 16 and then they are lowered by their actuators into the horizontal openings formed by the frameworks where they can be brought into engagement with the right side of the left frame section 16 of both frame works 12, 14. The left side welding units 20 release the two frameworks which are still supported in their elevated, spaced apart positions by further movable pins operated by cylinders that are incorporated into the welding machine. The lead arms are then used to push the two frames along the two stacked guide rails 70, 72, which, in this simplified arrangement, extend to about the left end 372 of the welding machine. The frameworks are then pushed along the guide rails to the left past the cutting or cleaning position, this cutting position indicated by reference number 80C in FIGS. 1 and 16. Although not illustrated, it is possible to provide short, sloping ramps along a portion of the upper guide rails 70 in order to change the distance that separate the two frameworks, for example, to make the vertical distance greater so that this distance will match the corresponding distance between the framework holders of the corner cleaning machine.

At this position, namely with the leftedge sections 16 of the frameworks to the left of the cutting position, the grippers 35 are brought into engagement with the left edge section 16 of the two frameworks and are used to move the two frameworks to the right and to clamp the two frame works in place at the cutting position 80C for application of the cutting and finishing tools 200 to the two left edge corners. In addition, upper and lower clamps 320 and 328 of the corner cleaning machine itself can be used to hold and steady the two plastic frame sections that are connected to each plastic frame section 16. The cutting and finishing tools 200 are applied to the two left corners of the window frame or sash in a manner known per se to clean debris and excess material remaining from the welding process.

Once the cutting and finishing of the lead edge corners has been completed, the two pairs of grippers 35 are released from the frame works and are moved towards the left away from the frameworks 12, 14. Both the gripper arms 34 and the lead arms 31 are moved upwardly by their respective actuators so that they are above the upper framework 12. The two robot arm assemblies are then moved along their respective tracks 32 to the right till the gripping assembly arms with the grippers 35 are positioned above and slightly to the right of the right edge plastic sections 18 of the frameworks. Then the gripper arm assemblies 34 are lowered so that the upper and lower grippers 35 can be brought into contact with the right edge frame sections 18 of the window frames. It will be appreciated that in order to do this, the gripper arm assembly 34 and the grippers 35 are lowered vertically so that they are a short distance to the rear of the right edge frame sections. This is necessary so that the lower gripper unit 35 will clear the upper framework as it is being lowered. Once the grippers have been lowered a sufficient distance so that the lower gripper is past the upper framework, the arm assembly 34 and the grippers can be moved a short distance to the left so that they are in position to engage and clamp the right side frame section. The grippers 35 then pull their respective frameworks so that the right frame sections 18 are located at the cutting position 80C for application of the cutting tools to the right edge corners. In this position the frame works can be held firmly not only by the grippers 35 but also by the clamps 278 and 280 of the cleaning machine itself, the latter clamps being used to hold the two opposite plastic frames that are connected to the right edge sections 18. Once the cutting and finishing of the frame works has been achieved, the two completed frameworks 12, 14 can then be moved to the left by the robot arm assemblies, for example they can be moved onto upper and lower unloading tables 375 (see FIG. 1).

In a preferred embodiment the grippers 35 are provided with a resilient material at their respective gripping points or surfaces and this material helps reduce vibration which allows for more consistency in cleaning the corners of the framework. It will also be understood that it is possible for the right edge sections of the frames to be moved into the cutting position 80C first for cutting and cleaning by the tools and then afterwards the left edge sections of the frameworks can be moved into the cutting position 80C for the cutting and cleaning of the left edge corners.

The method of manufacturing plastic frameworks, such as window frames or sashes according to the invention will now be described with particular reference to schematic FIGS. 14 to 16. In FIG. 14, the gripping assembly arms 34 are shown in dotted lines on the left side in the position at which the grippers 35 hold the two frames for cleaning of the left side corners, that is, the corners formed at the ends of the left side frame sections 16. As discussed above the two frameworks are brought to this position by the lead arms 31 which pull the two frameworks from their position at the left edge of the welding machine along the stacked guide rails 70, 72. The two lead arms in fact move the frame works beyond the cleaning position 80C initially. The grippers 35 are then maneuvered into position, clamp the two frameworks, and move them back so that the left edge frame sections 16 are at the cutting position 80C. Then with the grippers 34 and upper and lower clamps of the cleaning machine firmly clamping the frames in this position, the cleaning operation is carried out at the two corners at the ends of each left edge section 16.

The path of movement of each robot arm assembly 30 is illustrated by the arrows in of FIG. 14. After the initial cleaning operation on the left edge corners has been completed, the grippers 35 are disengaged and then they are moved a short distance to the left by the arms 34. This results in the grippers being clear of the left edge sections of the window frames so that the grippers can be raised as indicated by the arrow 170. They are raised a sufficient distance so that the robot arm assembly will have a clear, unobstructed path to move to the right. Each robot arm assembly is then moved to the right as indicated by the arrow 172 until they come to the position 174. The gripper arms 34 and the grippers are then moved a short distance downwardly by their respective vertical linear actuators until they are a short distance to the rear of their respective frameworks. The grippers are then moved forwardly a short distance so that they are in position to engage the right edge frame sections 18. The grippers are then used to pull the two frameworks along the rails 70, 72 so that the right edge frame sections are at the cutting position 80C, this position being illustrated in FIG. 15. In this position, side edge sections of the frameworks can also be firmly held by the clamps 278 and 280 of the cleaning machine. The tools 200 can then be used to clean and cut the right edge corners. In the position shown in FIG. 15, the two frameworks 12, 14 project to the left from the robot arm assemblies. After the right hand corners have been cleaned and the clamps of the cleaning machine opened, the two gripper arm members 34 and the grippers 35 are used to move the window frames to the left where the window frames are unloaded from the cleaning machine. The whole process then repeats itself to carry out a corner cleaning operation on the next pair of window frames formed by the welding machine.

FIG. 16 shows the pick-up position for the lead arms 31. In this position the lead arms are positioned to the right of the right end of the tracks 32. At the same time, the left side welding unit 20 has been moved to the left together with the two window frames 12 and 14 which are held firmly by the clamps of this welding unit. In this position the lead arms can be brought into engagement with the right side of the left side plastic sections and then, as discussed above, they can be used to push the frames along the stacked rails 70,72 beyond the position 80C. At this point the grippers 35 grip the left side sections of the frameworks and move them to the position 80C where the corner cleaning machine is able to trim any projecting weld material at the left edge corners by means of suitable knives and cutting tools 200 so that these corners are in a finished condition.

Figure 3:
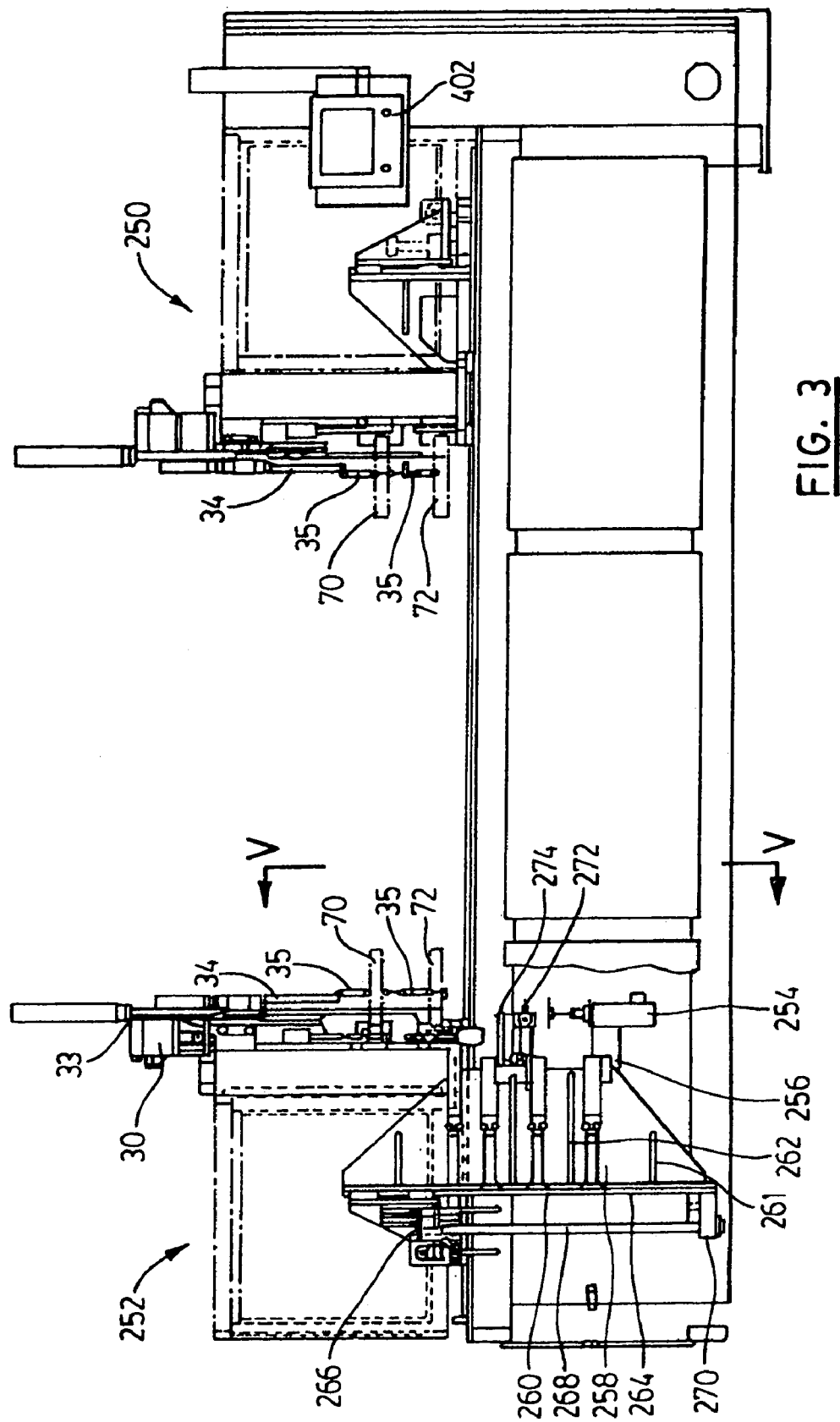
FIG. 3 is an end elevation of the corner cleaning machine including apparatus for moving the frameworks to this machine.

It will be understood that the welding machine, the transfer system including the robot arm assemblies and their respective tracks, and the corner cleaner 40 can be made to accommodate window frames of various lengths, for example ranging as low as one foot in length or less and up to and extending eight feet in length. Furthermore, the operation of the transfer system of the invention, including the robot arm assemblies and the various clamping mechanisms both on the arm assemblies and the cleaning machine can be controlled by suitable software using a personal computer or other computing device. The screen monitor 402 for the complete control system is shown in FIGS. 2 and 3.

As will be apparent to those skilled in the art from the above detailed disclosure and the accompanying drawings, many alterations and modifications are possible in the practice of the various aspects of this invention without departing from the spirit and scope of the invention. Accordingly the scope of the invention is to be construed broadly and as defined in the following claims.

What is claimed is:

1. An apparatus for moving frameworks such as window frames or sashes, from a welding machine to a work station for further processing of the frameworks, said apparatus comprising:
   a track adapted for mounting at an elevated position so as to extend substantially horizontally from said welding machine to said work station;
   an arm assembly mounted for movement along said track and having gripping devices arranged one above the other, each gripping device adapted to releasably engage and grip one of said frameworks, said arm assembly including a lead arm spaced horizontally away from said gripping devices, said apparatus including a vertical linear actuator for moving said lead arm selectively in a vertical direction, whereby during use of said apparatus, said vertical linear actuator is able to lower said lead arm into openings formed by the frameworks; and
   an actuator arrangement for moving said arm assembly along said track between a first position where said arm assembly can engage the frameworks when they are arranged one above the other in said welding machine and then move the frameworks to a second position where said gripping devices engage and grip the frameworks at said work station during use of the apparatus, said actuator arrangement being able to move said lead arm horizontally to remove said frameworks from said welding machine.

2. An apparatus according to claim 1 including first and second pairs of horizontally extending guide rails adapted to extend during use of said apparatus from said work station towards said welding machine, said first pair being located above said second pair, wherein horizontal movement of said lead arm by said actuator arrangement is able to move two of said frame works respectively from said welding machine to and along said first and second pairs of guide rails during use of the apparatus.

3. An apparatus according to claim 2 including an adjustable mounting arrangement for both pairs of guide rails whereby a horizontal distance between the guide rails of each pair can be changed and can be selected to correspond to a length or width of each welded framework.

4. An apparatus according to claim 1 wherein said vertical linear actuator comprises at least one pneumatic linear actuator having a pneumatic cylinder and a vertical actuator rod movable in said cylinder and connected to said lead arm in order to move said lead arm in the vertical direction.

5. An apparatus according to claim 1 wherein said actuator arrangement includes an elongate toothed rack extending along said track and connected thereto, a rotatable gear operatively engaging said rack, and a drive motor for rotating said gear in order to cause said arm assembly to move horizontally along said track.

6. An apparatus according to claim 1 wherein said arm assembly also includes a vertically extending gripper arm, there are two of said gripping devices mounted on a lower section of said gripper arm one above the other, and said lead arm is connected to said gripper arm by a horizontally extending arm section.

7. An apparatus for moving frameworks, such as window frames or sashes, from a welding machine to a work station for further processing of the frameworks, said apparatus comprising:
   two parallel tracks adapted for mounting at an elevated position so as to extend substantially horizontally from said welding machine to said work station;

two arm assemblies each mounted for movement along a respective one of said tracks and each having two gripping devices arranged one above the other, one gripping device of one arm assembly being paired with and horizontally aligned with a respective one of the gripping devices of the other arm assembly, each pair of gripping devices being adapted to engage and grip one of said frameworks; and two actuator arrangements for moving respectively said arm assemblies along said tracks between a first position where said arm assemblies can engage the two frameworks when they are arranged one above the other in said welding machine and then move the two frameworks to a second position where said gripping devices engage and grip the frameworks at said work station during use of the apparatus.

8. An apparatus according to claim 7 wherein each arm assembly includes a lead arm spaced horizontally away from the gripping devices of the same arm assembly and said apparatus includes two vertical linear actuators each capable of moving a respective arm assembly selectively in a vertical direction during use of said apparatus, each vertical linear actuator being able to lower its respective lead arm into two aligned openings formed by said two frameworks and then the actuator arrangements are able to move the lead arms horizontally to remove said frameworks from said welding machine.

9. An apparatus according to claim 8 including first and second pairs of horizontally extending guide rails adapted to extend from said work station towards said welding machine, said first pair being located above and spaced apart from said second pair, wherein horizontal movement of the two lead arms by said actuator arrangements is able to move said two frameworks along said first and second pairs of guide rails and to said work station during use of the apparatus.

10. An apparatus according to claim 9 including an adjustable mounting arrangement for both pairs of guide rails whereby a horizontal distance between the guide rails of each pair can be changed and can be selected to correspond to a length or width of each welded framework.

11. An apparatus according to claim 9 wherein each of said vertical linear actuators includes a pneumatic linear actuator having a pneumatic cylinder and a vertical actuator rod movable in said cylinder and connected to its respective arm assembly in order to move this arm assembly in the vertical direction.

12. An apparatus according to claim 9 wherein each of said actuator arrangements includes an elongate toothed rack extending along a respective one of said two tracks and connected thereto, a rotatable gear operatively engaging said rack, and a drive motor for rotating said gear in order to cause its respective arm assembly to move horizontally along said track.

13. An apparatus according to claim 9 wherein each arm assembly also includes a vertically extending gripper arm with a lower section on which said two gripping devices are mounted, and each lead arm is rigidly connected to a respective one of the gripper arms by a horizontally extending arm section.

14. An apparatus for moving frameworks, such as window frames or sashes, from a first work station to a second work station for further processing of the frameworks, said apparatus comprising:

a track adapted for mounting so as to extend horizontally from one location adjacent said first work station to another location adjacent said second work station;

an arm assembly mounted for movement along said track and adapted to move first and second separate frameworks simultaneously from said first work station to said second work station;

first and second pairs of horizontally extending guide rails adapted for mounting so as to extend substantially from said first work station to said second work station, said first pair being located above said second pair, the distance between the guide rails of each pair corresponding substantially to an external dimension of each framework; and a power actuator arrangement for moving said arm assembly along said track as required for the movement of said separate frameworks from said first work station to said second work station.

15. An apparatus according to claim 14 wherein said arm assembly includes an arm device for engaging and moving said first and second separate frameworks and linear actuator means for moving said arm device selectively in a vertical direction, whereby during use of said apparatus, said linear actuator means is able to lower one section of said arm device into openings formed by the first and second frameworks when these frameworks are located at said first work station and then said power actuator arrangement is able to move said arm device horizontally so that said arm device engages said frameworks and pulls each framework along a respective one of said pairs of guide rails.

16. An apparatus according to claim 15 wherein said linear actuator means includes at least one vertically extending pneumatic cylinder and an actuator rod slidable vertically in said cylinder, an end of said rod being connected to said one section of the arm assembly.

17. An apparatus according to claim 14 wherein both pairs of guide rails are adjustably mounted so that an effective horizontal distance between the guide rails of each pair can be changed and can be selected to correspond closely to said external dimension of the particular frameworks being moved.

18. An apparatus according to claim 14 wherein said power actuator arrangement includes an elongate toothed rack extending along said track and connected thereto, a rotatable gear operatively engaging said rack, and a drive motor for rotating said gear in order to cause said arm assembly to move horizontally along said track, said drive motor being mounted on said track for horizontal movement with said arm assembly.

19. An apparatus according to claim 18 wherein said arm assembly includes two gripping devices arranged one above the other and each adapted to releasably grip a respective one of said frameworks during use of said apparatus, said gripping devices being usable to grip and hold said frameworks rigidly during one or more machining operations at said second work station.

* * * * *